US010554520B2

(12) United States Patent
Zabarsky et al.

(10) Patent No.: US 10,554,520 B2
(45) Date of Patent: Feb. 4, 2020

(54) DATA PATH MONITORING IN A DISTRIBUTED STORAGE NETWORK

(71) Applicant: Datrium Inc., Sunnyvale, CA (US)

(72) Inventors: Jeffrey Zabarsky, Sunnyvale, CA (US); Gokul Soundararajan, San Jose, CA (US); Aleksandr Mirgorodskiy, San Mateo, CA (US)

(73) Assignee: Datrium, Inc., Sunnyvale, CA (US)

( * ) Notice: Subject to any disclaimer, the term of this patent is extended or adjusted under 35 U.S.C. 154(b) by 100 days.

(21) Appl. No.: 15/616,791

(22) Filed: Jun. 7, 2017

(65) Prior Publication Data

US 2018/0287912 A1 Oct. 4, 2018

Related U.S. Application Data

(60) Provisional application No. 62/481,098, filed on Apr. 3, 2017.

(51) Int. Cl.
*H04L 12/26* (2006.01)
*H04L 29/08* (2006.01)
*H04L 12/24* (2006.01)

(52) U.S. Cl.
CPC .......... *H04L 43/0811* (2013.01); *H04L 41/12* (2013.01); *H04L 43/10* (2013.01); *H04L 67/1097* (2013.01)

(58) Field of Classification Search
CPC . H04L 43/0811; H04L 67/1097; H04L 41/12; H04L 43/10; H04L 43/0864;

(Continued)

(56) References Cited

U.S. PATENT DOCUMENTS 6,173,411 B1 * 1/2001 Hirst .................... H04L 41/0668
709/223
6,392,990 B1 * 5/2002 Tosey ................ H04L 29/12018
370/218

(Continued)

OTHER PUBLICATIONS

European Patent Office, "Search Report" in application No. 18165363. 5-1221, dated Jun. 27, 2018, 12 pages.

(Continued)

*Primary Examiner* — Vivek Srivastava
*Assistant Examiner* — Muhammad Raza
(74) *Attorney, Agent, or Firm* — Hickman Palermo Becker Bingham LLP

(57) ABSTRACT

Techniques for monitoring and sending network connectivity information for connection pathways to host machines is provided. A storage node comprises a plurality of attached network interfaces and is operatively coupled to storage devices that are accessible to the host machines through network interfaces attached to the storage node. Each of the network interfaces send messages to the host machines. The storage node, receives host messages from at least one host machine. The storage node determines connectivity information about connectivity between network interfaces and host machines. The storage node receives a request for data that is stored on the one or more storage devices, from a host machine, at a target network interface, where the target node was chosen by the host machine based upon the connectivity information.

20 Claims, 9 Drawing Sheets

(58) Field of Classification Search
CPC . H04L 67/1008; H04L 41/0816; H04L 47/36; G06F 3/0635; G06F 3/067
See application file for complete search history.

(56) References Cited

U.S. PATENT DOCUMENTS

| | | | |
|---|---|---|---|
| 6,732,186 B1* | 5/2004 | Hebert | H04L 41/0681 |
| | | | 709/226 |
| 9,912,560 B2* | 3/2018 | Gong | G06F 11/00 |
| 2003/0177290 A1 | 9/2003 | Ayukawa et al. | |
| 2005/0259634 A1* | 11/2005 | Ross | H04L 43/0811 |
| | | | 370/351 |
| 2006/0092843 A1* | 5/2006 | Iwami | H04L 29/06 |
| | | | 370/235 |
| 2007/0233700 A1 | 10/2007 | Tomonaga | |
| 2008/0127199 A1 | 5/2008 | Miki | |
| 2009/0190482 A1* | 7/2009 | Blair | H04L 43/0858 |
| | | | 370/250 |
| 2010/0125857 A1 | 5/2010 | Dommeti et al. | |
| 2010/0165849 A1* | 7/2010 | Eisenberg | H04L 43/0811 |
| | | | 370/242 |
| 2011/0161489 A1* | 6/2011 | Bhatt | H04L 45/245 |
| | | | 709/224 |
| 2015/0103679 A1* | 4/2015 | Tessmer | H04L 43/0811 |
| | | | 370/252 |
| 2015/0293708 A1 | 10/2015 | Lang et al. | |
| 2016/0012008 A1* | 1/2016 | Akiyoshi | H04L 45/586 |
| | | | 709/213 |
| 2017/0187638 A1* | 6/2017 | Thomas | H04L 47/36 |
| 2017/0250887 A1* | 8/2017 | Sadana | |
| 2017/0302730 A1* | 10/2017 | Jastrzebski | H04L 41/0816 |
| 2017/0359239 A1* | 12/2017 | Zhang | H04L 41/0803 |
| 2017/0366437 A1* | 12/2017 | Bonica | H04L 43/065 |
| 2018/0063019 A1* | 3/2018 | Martin | H04L 47/781 |
| 2018/0091413 A1* | 3/2018 | Richards | H04L 12/4641 |
| 2018/0123903 A1* | 5/2018 | Holla | H04L 41/22 |
| 2018/0176110 A1* | 6/2018 | Ignatuk | H04L 65/1033 |

OTHER PUBLICATIONS

European Claims in application No. 18165363.5-1221, dated Jun. 2018, 5 pages.

* cited by examiner

FIG. 3

|  | Network Interface 132 | Network Interface 134 | Network Interface 136 | Network Interface 138 |
|---|---|---|---|---|
| Host Machine 102 | UP | DOWN | UP | UP |
| Host Machine 104 | UP | UP | DOWN | DOWN |
| Host Machine 106 | UP | UP | DOWN | DOWN |

US 10,554,520 B2

DATA PATH MONITORING IN A DISTRIBUTED STORAGE NETWORK

BENEFIT CLAIM

This application claims the benefit under 35 U.S.C. § 119(e) of provisional application 62/481,098, filed Apr. 3, 2017, the entire contents of which is hereby incorporated by reference for all purposes as if fully set forth herein.

FIELD OF THE INVENTION

The present invention relates to monitoring connection pathway statuses between endpoints in distributed storage network.

BACKGROUND

Network aggregation is a technique of aggregating multiple physical links into one link for the purpose of increasing speed and providing fault tolerance in network systems that require constant uptime. Specifically, link aggregation techniques combine multiple network connections in parallel in order to increase throughput beyond the limits of a single connection and to increase network resilience in the event of network failures. One such implementation of link aggregation is the Link Aggregation Control Protocol (LACP). LACP configurations increase network bandwidth to servers by configuring aggregated links on servers, network switches, and other network equipment.

However, maintaining high bandwidth becomes increasingly difficult when using link aggregation protocols because bandwidth may be limited to the maximum bandwidth of a single device within a network path. Additionally, bandwidth on configured network paths may be limited due to changes in network load that may cause bottlenecks if network devices on the configured network paths unexpectedly increase. Link aggregation protocols, such as LACP, require configuration of multiple network devices, and once configured, require significant effort to reconfigure the network devices to account for changes in data flow across the network. Therefore, a method and system for monitoring and configuring network devices to account for the current state of a network is desired.

BRIEF DESCRIPTION OF THE DRAWINGS

In the drawings:

FIG. 3 depicts an example embodiment of a connectivity map represented as a matrix of connections between host machines and network interfaces.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for monitoring and sending connectivity information for connection pathways between one or more host machines and one or more network interfaces attached to a storage node. According to one embodiment, a particular storage node comprises a plurality of attached network interfaces. The particular storage node is operatively coupled to one or more storage devices that are accessible to the one or more host machines through any one of the plurality of network interfaces attached to the particular storage node. Each of the network interfaces send messages to each of the one or more host machines. The particular storage node also receives messages from at least one host machine of the one or more host machines. The particular storage node determines connectivity information using the messages sent to the host machines and received from the host machines. The connectivity information is based on connectivity between each network interface of the plurality of network interfaces and each host machine. The storage node receives a request to store data or retrieve stored data that is stored on the one or more storage devices, from a host machine, at a target network interface, where the target node was chosen by the host machine based upon the connectivity information.

Structural Overview

Figure 1:
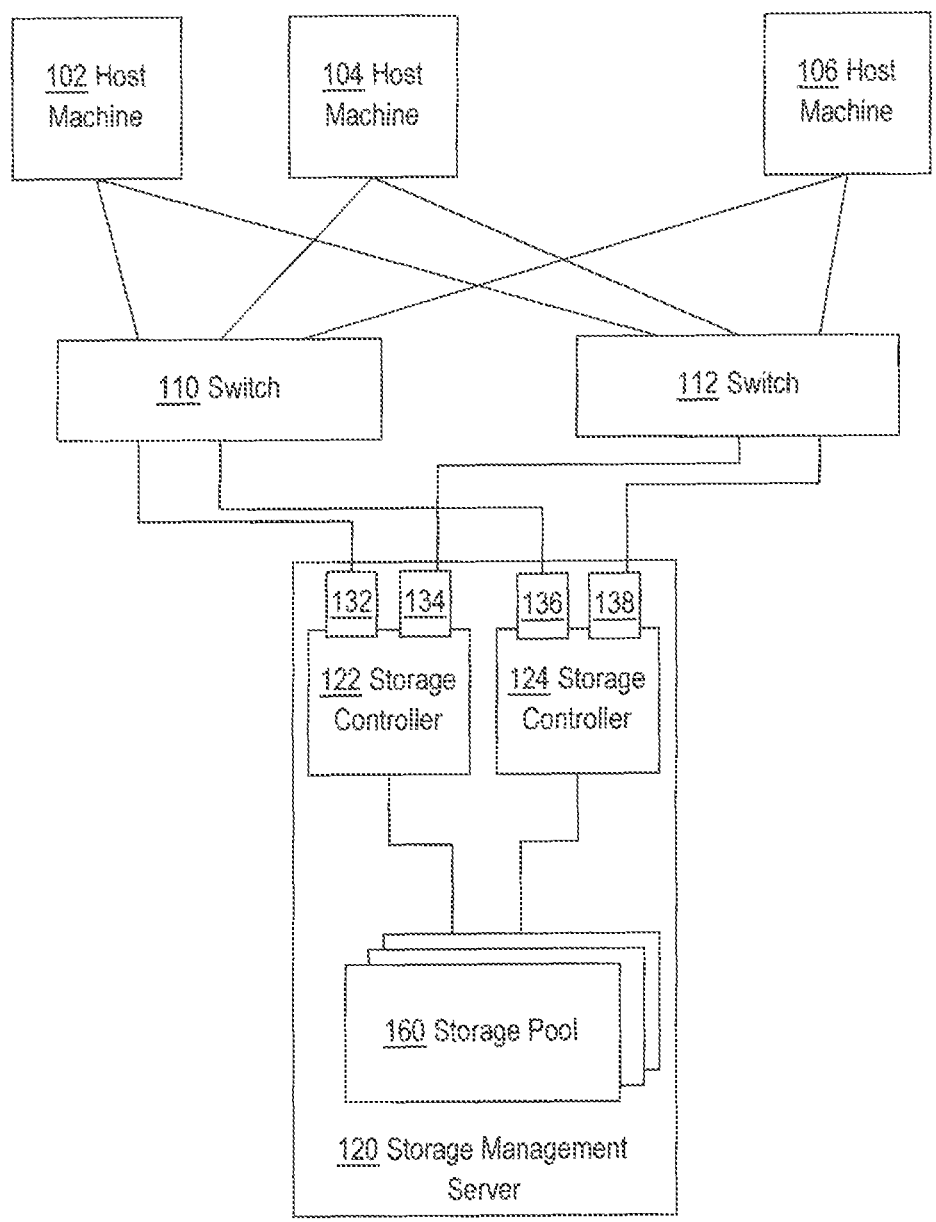
FIG. 1 depicts a sample embodiment of a network configuration for a distributed storage system including storage controllers connected to host machines via network switches.

A distributed storage system network is made up a communicatively coupled computing devices including, but not limited to, one or more host machines, network switches, and one or more storage management servers. The one or more storage management servers may contain one or more storage controllers and a storage pool. FIG. 1 depicts a sample embodiment of a network configuration for a distributed storage system including storage controllers connected to host machines via network switches. In the embodiment illustrated in FIG. 1, host machines 102, 104, and 106 represent computer devices configured to implement one or more applications and/or one or more operating systems configured to store data within the storage pool 160. Each of the host machines 102, 104, and 106 are communicatively coupled, through redundant links, to network switches 110 and 112. In an embodiment, each of the host machines 102, 104, and 106 are equipped with two or more network interfaces, which are connected to network switches 110 and 112 for multipath network routing purposes. In an embodiment, the two or more network interfaces may be bonded such that they share the same physical address and only one of the two or more network interfaces is active any given time. In another embodiment, the network interfaces within the host machines 102, 104, and 106 may be configured as separate physical devices with unique physical addresses which allow each network interface to be assigned a distinct IP address.

In an embodiment, network switches 110 and 112 represent network switches communicatively coupled to the host machines 102, 104, and 106 and storage management server 120. Switches 110 and 112 are configured to route data packets to and from the host machines 102, 104, and 106 and the storage management server 120.

In an embodiment, storage management server 120 represents one or more server devices configured with multiple hardware and software components to implement storage controllers 122 and 124. Storage controllers 122 and 124 are each configured to manage data storage requests from host machines to storage devices within the storage pool 160. The storage management server 120 is configured to include hardware that allows for local and remote storage of storage controller data including networking and host machine availability and configuration data. In an embodiment, the storage management server 120 is configured to implement active and passive usage roles for storage controllers 122 and 124, where an active store controller services data requests from host machines and a passive storage controller is designated as a backup storage controller for the active storage controller. In another embodiment, the storage management server 120 is configured to implement parallel usage of storage controllers 122 and 124, where both controllers are actively processing data requests from host machines 102, 104, and 106. Additionally, the storage management server 120 may be configured to implement additional storage controllers based upon the physical hardware availability and setup of the storage management server 120. FIG. 1 represents one example embodiment, of the storage management server 120 and connections between the storage management server 120, host machines 102, 104, and 106, and the storage pool 160.

Figure 4:
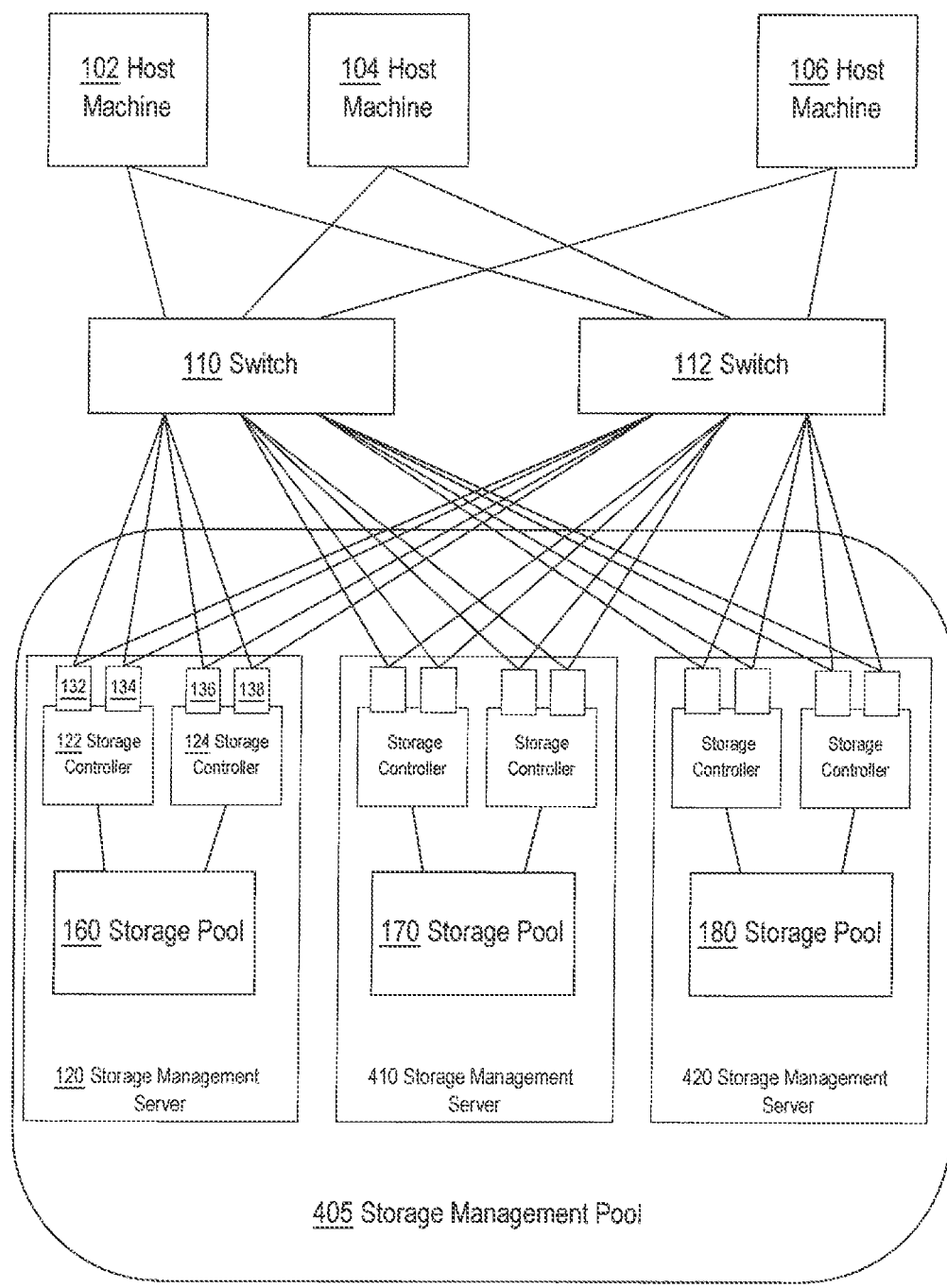
FIG. 4 depicts a sample embodiment of a network configuration for a distributed storage system including a storage management pool with multiple storage management servers.

Other embodiments, may implements multiple storage management servers that may be configured to work in parallel or act as backup systems to the storage management server 120. FIG. 4 depicts another embodiment of a network configuration for a distributed storage system including a storage management pool 405, which includes multiple storage management servers. In an embodiment, the storage management pool 405 contains storage management servers 120, 410, and 420. Each of the storage management servers 120, 410, and 420 are configured with multiple hardware and software components to implement multiple storage controllers. Storage management servers 120, 410 and 420 are each communicatively coupled to network switches 110 and 112. In an embodiment, the storage management servers 120, 410, and 420 each include a unique set of storage devices within the storage pools 160, 170, and 180. In another embodiment, each of the storage management servers 120, 410, and 420 may be configured to communicate with sets of external storage devices. In an embodiment, storage management server 120 may be configured as the controlling management server which receives and routes particular data requests from host machines 102-106 to the appropriate storage management server 410 and 420 which are configured to communicate with the storage devices related to the particular data requests.

In an embodiment, host machines communicate with the connected file systems within the storage pool 160 through storage controllers 122 and 124. Storage controllers 122 and 124 each comprise processing circuitry to control one or more disks, flash or other SSD devices or other devices comprising the persistent storage devices within the storage pool 160. Storage controllers 122 and 124 each contain network interfaces necessary to connect to the network. In an embodiment, network interfaces 132, 134, 136, and 138 each represent a network interface that is connected to network switches 110 and 112. Each of the network interfaces 132, 134, 136, and 138 are configured with separate IP addresses which allow network interfaces 132, 134, 136, and 138 to represent a distinct network path to storage controllers 122 and 124. For example, a host machine may send data to storage controller 122 via two distinct network paths using distinct IP addresses for network interfaces 132 and 134.

Referring to FIG. 1, in an embodiment the storage controllers 122 and 124 are configured to send multiple types of test messages to host machines 102-106 and other storage controllers that may be implemented on other storage management servers, such as storage management servers 410 and 420, for the purpose of determining connectivity health to other devices. The storage controllers 122 and 124 may be configured to receive connectivity status requests and send connectivity information for connection pathways between the network interfaces 132, 134, 136, and 138 and the requesting device.

In an embodiment, the host machines 102-106 may be further configured to send multiple types of test messages to storage controllers located on storage management servers 120, 410, and 420. By configuring host machines 102-106 to initiate and send test messages, directional connectivity statuses may be established. For example, connectivity information for connection pathways may be generated that specifies connection information for sending data from host machines to storage controllers and for sending data from storage controllers to host machines.

Storage pool 160 contains storage nodes 710-1, 710-2 . . . and 710-N, which in turn, contain storage devices used to physically store data. A detailed description of implementations of the storage pool 160, storage devices, and interconnectivity between host machines and storage controllers that may read, write, and update data is described in the DISTRIBUTED VIRTUAL ARRAY section herein.

Functional Overview

Figure 2:
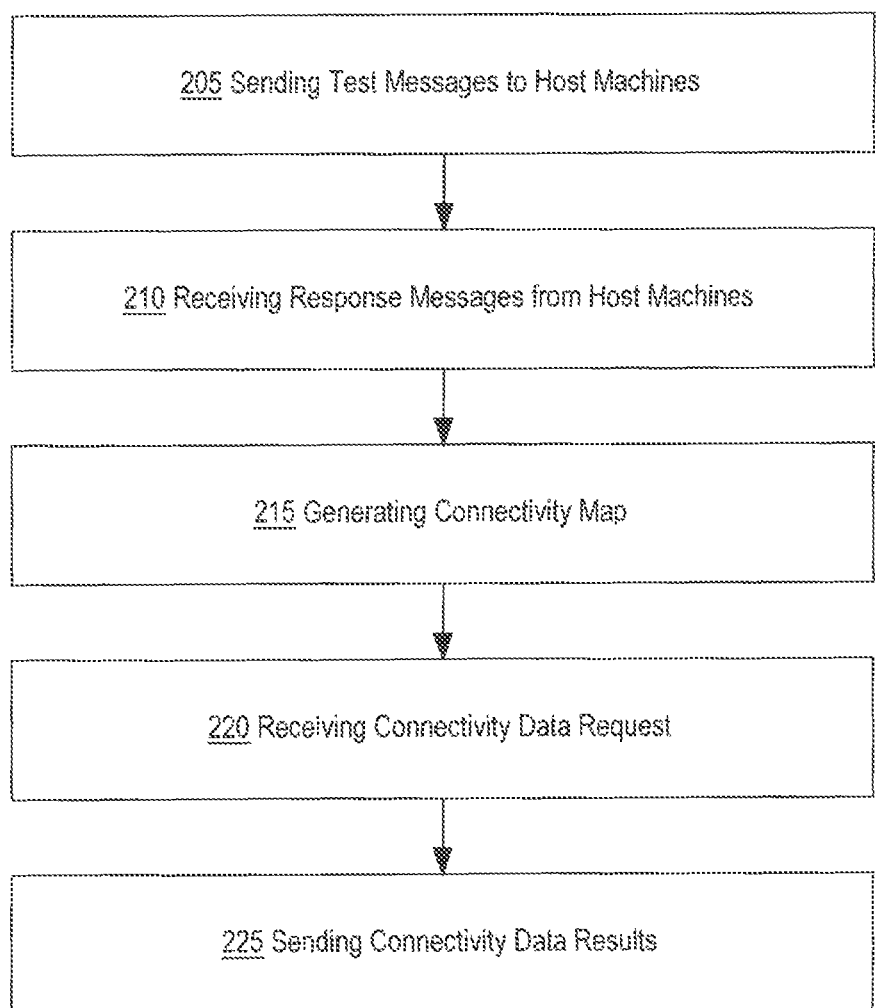
FIG. 2 depicts a sample embodiment of determining connectivity information, generating a connectivity map, and sending connectivity status information to the host machines.

Techniques are described herein where storage controllers determine connectivity status between host machines 102-106 and network interfaces 132-138, which may be used to determine usable connection pathways between host machines 102-106, storage controllers 122-124, and the storage pool 160. FIG. 2 depicts an example embodiment of determining connectivity information, generating a connectivity map of connection statuses between host machines and storage controllers, and sending connectivity status information to the host machines.

Test Messages

In an embodiment, the storage controllers 122 and 124 generate and send test messages to the host machines 102, 104, and 106 from each of the network interfaces 132-138. For example, test messages are generated and sent from network interfaces 132-138 to each of the host machines 102, 104, and 106. In an embodiment, the host machines 102, 104, and 106 may be configured with multiple unbonded network interfaces each configured with separate IP addresses. Each of the multiple unbonded network interfaces on the host machines 102, 104, and 106 are configured to receive test messages from network interfaces 132-138.

In an embodiment, a test message represents one or more data packets of data sent from a source to a particular target for the purposes to determining connectivity to the target and measuring roundtrip time for the test message sent from the source and the target echoing back the message to the source. An example of a test message includes a ping message, which is an Internet Control Message Protocol (ICMP) echo request packets that are sent from a host device to a remote target device. The remote target device then sends back a, ICMP echo reply message to the host device. Embodiments of the test message may include, but are not limited to, small test messages primarily configured to test reachability and roundtrip time to the host machine from a network interface, large test messages configured to test reachability and quality of connection to host machines based upon errors and packet loss of large test messages, and any other type of test message used to determine connection speed, reliability, and availability of connections between the network interfaces 132-138 and the host machines 102-106.

Referring to FIG. 2, step 205 depicts the storage controllers sending test messages to each of the host machines. In an embodiment, test messages are sent from each of the network interfaces 132-138 to each of the host machines 102-106. By sending test messages from each of the network interfaces 132-138 to each of the host machines 102-106, each network pathway from each network interface 132-138 to each host machine 102-106 is tested for connectivity. For example, test messages sent from network interfaces 132-138 to host machine 102 may be used to determine which of the network interfaces 132-138 currently has connectivity to host machine 102. Additionally, the test messages sent from network interfaces 132-138 to host machine 102 may also be used to determine which network interface currently does not have connectivity to host machine 102.

In an embodiment, the storage controllers 122 and 124 may be configured to periodically send test messages to each of the host machines 102-106. For example, the storage controllers 122 and 124 may be configured to send test messages to the host machines every 3 seconds. The storage controllers 122 and 124 may also be configured to periodically schedule sending small and large test messages. For instance, the small test message may be scheduled to be sent to host machines 3 times per minute and large test messages may be scheduled to be sent to host machines once every minute.

Test messages are not limited to testing connectivity to host machines 102-106. In an embodiment, storage controllers 122 and 124 may be configured to send test messages to storage controllers implemented on storage management servers 410 and 420. These test messages may be used to determine connectivity between multiple storage controllers. Additionally, storage controllers on storage management servers 410 and 420 may also send test messages to host machines 102-106, and other storage controllers such as storage controllers 122 and 124. In yet another embodiment, test messages may be sent from storage controllers 122 and 124 to remote replicated distributed storage system networks for the purposes of determining connection pathways to send replication data to replication environments that may be implemented to replicate the current distributed storage system network.

In response to receiving test messages from each of the network interfaces 132-138, each of the host machines 102-106 are configured to send response messages back to the network interfaces that sent the test messages. For example, host machine 102, after receiving test messages from each of the network interfaces 132-138, is configured to generate and send response messages back to network interfaces 132-138. Using ICMP messages as an example, if the test message sent by the network interface 132 is an ICMP echo request message, then a response message may be an ICMP echo reply message sent by the host machine 102.

Embodiments of test messages and response messages are not limited to ICMP messages, for example custom or proprietary test messages and reply messages may be used. In another embodiment, test messages themselves are not limited to a specific message or type of message. Data packets sent and received by network interfaces 132-138 and host machines 102, 104, and 106 may be used to indicate connectivity between endpoints. For example, specific data packets may be sent from network interface 132 to host machine 102 in order to test connectivity pathways. The specific data packets may include actual data related to a request or a response, dummy data used specifically to test the connection pathway, or the specific data packets that have been appended to request or response messages sent between endpoints that are used to test the connection pathways.

Step 210 depicts a network interface of network interfaces 132-138 receiving a response message from a host machine. For example, network interface 132 receives an ICMP echo reply message from host machine 102. The ICMP echo reply message may be used to indicate that connectivity exists between network interface 132 and host machine 102.

In an embodiment, if a particular network interface does not receive a response message after a specific period of time, it may be determined based upon the absence of a response message from a particular host machine that the particular network interface does not have a working connection to the particular host machine. For example, if network interface 134, on storage controller 122, sent a test message to host machine 104 and network interface 134 did not receive a response message from host machine 104 after a specific period of time, then storage controller 122 may conclude that the connection from network interface 134 to host machine 104 is currently down.

Connectivity Map

In an embodiment, upon receiving the response messages at network interfaces 132-138, storage controllers 122 and 124 may be configured to store information related to test messages sent and response messages received within the storage management server 120. The storage management server 120 may include local memory configured to store connectivity metrics for test messages and response messages sent from and received by network interfaces 132-138 attached to storage controllers 122 and 124. In another embodiment, the storage management server 120 may be configured to store connectivity metrics at a remote location within the storage pool 130.

In an embodiment, the storage management server 120 is configured to store the connectivity status information for connection pathways between network interfaces 132-138 and host machines 102-106. Connectivity status information for connection pathways may be stored within a local database table or tables, or any other storage format.

Referring back to FIG. 2, at step 215 a connectivity map of connection statuses between host machines and network interfaces is generated. In an embodiment, the storage management server 120 generates and maintains a connectivity map that maps the connectivity status and connection properties between network interfaces 132-138 and host machines 102-106. The connectivity map serves as an active registry of connection pathways between host machines and network interfaces. The connectivity map contains up-to-date status information regarding connection pathways based upon sent test messages and received response messages. For example, the storage management server 120 may store data corresponding to each test message sent from network interfaces 132-138 and each response message received at network interfaces 132-138. Based upon the stored test message and response message data, the storage management server 120 may generate a connectivity map, in the form of one or more database tables, which contain connectivity statuses and connectivity properties for each connection pathway between network interfaces 132-138 and host machines 102-106. Connection statuses and properties may be based upon whether response messages were received from host machines corresponding to the test messages sent from network interfaces and the latency between sending the test messages and receiving the corresponding response messages.

FIG. 3 depicts an example embodiment of a connectivity map represented as a matrix of connections between host machines and network interfaces. Within connectivity map 305, rows 310 represent the different host machines within the current network setup and columns 315 each represent the network interfaces from the storage controllers 122 and 124. In an embodiment, connection pathway statuses between host machines and network interfaces are represented by the intersection between a particular host machine and a particular network pathway. For example in connectivity map 305, the connection pathway between host machine 102 and network interface 132 is currently "up", while the connection pathway between host machine 102 and network interface 134 is currently "down". Using the current connectivity statuses in the connectivity map 305, host machine 102 may communicate with storage controller 122 via network interface 132 because the pathway between host machine 102 and network interface 132 is currently up.

In an embodiment, determining whether connections between specific network interfaces and specific host machines are either up or down may be based upon a specific number of test message attempts. For example, the storage controller 122 may determine that a connection between network interface 132 and host machine 102 is up based upon sending and receiving three consecutive test messages and response messages. Similarly, the storage controller 122 may determine that a connection between network interface 134 and host machine 104 is down based upon sending three consecutive test messages and not receiving any response message over a particular period of time. In an embodiment, determining connectivity between a network interface and a host machine may be based on a configured set of criteria including, but not limited to, a consecutive number of successful or unsuccessful test message attempts, duration of time between sending a test message and receiving a response message, successful response messages received for different types of test messages, and any other measurable response metrics reported within the received response message.

In an embodiment, the storage management server 120 may be configured to determine that a specific connection status between a host machine and a network interface is down based upon a specific latency threshold. For example, if latency time between sending a test message and receiving a corresponding response message exceeds 1000 milliseconds (ms), then the storage management server 120 may determine that the connection pathway between a specific host and a specific network interface is too slow for communication and is therefore deemed "down." Referring back to FIG. 3, the connection pathway between host machine 102 and network interface 134 may be determined as down because the average latency between sending the test message and receiving the response message was above 1000 ms.

Other embodiments of the connectivity map 305 may include additional connection details related to connection pathways between the host machines and the network interfaces. For example, along with determining whether a connection pathway is up or down, the storage management server 120 may also determine properties such as, connection speeds based on latency, connection quality based on the number of successful and unsuccessful response messages, and current network load for each connection pathway. For example, each connection pathway may contain information that specifies whether the connection pathway currently is experiencing heavy or light usage based upon the amount of data traffic on the connection pathway.

The connectivity map 305 is not limited to connection pathways between network interfaces 132-138 and host machines 102-106. In an embodiment, the storage management server 120 may include, within the connectivity map 305, connection pathway information between multiple storage management servers 120, 410, and 420 and their corresponding storage controllers and network interfaces. In another embodiment, the storage management server 120 may include connection pathway information to replication networks configured to replicate the distributed storage system network. In yet other embodiments, the storage management server 120 may generate multiple connectivity maps, each configured to contain connection information between different types of connection pathways such as storage controller-to-host machine, storage controller-to-storage controller, and active devices-to-replicated devices.

The storage management server 120 may be configured to receive connectivity map update messages from other devices such as storage controllers on other storage management servers, host machines, and replicated devices. Details for receiving connectivity map update messages are described in detail in the UPDATING CONNECTIVITY MAP section herein.

In an embodiment, the connectivity map may be used to determine which network interfaces should be used to communicate between storage controllers 122 and 124 and host machines 102-106, including increasing overall bandwidth between storage controllers 122 and 124 and host machines 102-106 by allowing network traffic on multiple network interfaces attached to a storage controller. For example, controller network bandwidth available to host machines 102 and 104 would be doubled if each host spreads its network traffic across network interfaces 132 and 134. If host machine 102 had two network interfaces, bandwidth to the host machine 102 would be doubled by spreading traffic across network interfaces 132 and 134.

In an embodiment, the connectivity map may be used to determine a stable connection pathway between a specific network interface and a specific host machine for communicating data requests between a particular client process and a particular server process. For example using the connectivity map, a stable connection pathway may be established for particular processes on host machine 102 to communicate with storage controller 122, via network interface 132. If the connection is reset, then a new connection may be established between host machine 102 and network interface 132, thereby avoiding the need to again determine the connection pathway between the host machine 102 and storage controller 122.

In an embodiment, stable connection pathways may be configured by assigning a particular network interface to a particular process on a host machine using a random number assignment techniques to determine which network interface to send data requests. For example, techniques such as using a server process identifier in a hashing salt, may be used to assign a specific network interface as the destination interface for processes on a host machine. By doing so, data requests from a particular host machine may be spread across multiple network interfaces based upon the specific process that initiates the data request. This approach reduces the presence of client skew if a particular host machine sends a disproportionate amount of data because the data requests are sent to multiple different network interfaces based upon the different processes on the particular host machine.

In an embodiment, determining connection pathways to available network interfaces may include techniques to account for uneven load distribution based on either client skew of server skew. Client skew may cause an uneven distribution of load from multiple clients. In one embodiment, client skew may be reduced by including a server process identifier in a hashing salt when assigning a target network interface. The server processing identifier may be used to ensure that traffic from clients, including traffic from a single busy client, is not sent to a single network interface. Instead connections are distributed between different services and different network interfaces based upon different hashing salts that includes unique server process identifiers.

Server skew may cause an uneven distribution of load among services on the storage controller 122. In order to reduce potential instances of server skew, each host machine 102-106 generates a random number, which also includes a hashing salt, for the lifetime of their processes. This allows different host machines 102-106 to assign different target network interfaces, so that connections to the busiest service, running on the storage controller 122 are uniformly spread across different network interfaces of the storage controller 122.

Assigning Roles to Storage Controllers

In an embodiment, the storage management server 120 is configured to use the connectivity status information in the connectivity map to determine active and passive roles for storage controllers 122 and 124. An active role for a storage controller refers to designating a specific storage controller as the storage controller that processes data requests received from host machines and routes the data requests to the appropriate destination within the storage pool 160. A passive role for a storage controller refers to designating a specific storage controller as the storage controller that serves as a back up to the active storage controller. The passive storage controller is available if the active storage controller fails. For example, the storage management server 120 may determine the active and passive roles for the storage controllers based upon which network interfaces have connection pathways that are up. Referring to FIG. 4, connectivity status information between storage controllers on storage management servers 120, 410, and 420, and host machines 102, 104, and 106 may be used to determine which storage controller should be active and which storage controller should be passive. For instance, the storage management server 120 may assign storage controller 122 as the active controller and storage controller 124 as the passive controller based upon which storage controller, within the storage management server 120 has better cross-storage management server connectivity. Additionally, active/passive failover may be based on host connectivity between storage controllers 122 and 124 and host machines 102, 104, and 106. Determining connectivity status information may be based upon connection pathways described in the connectivity map.

In an embodiment, active and passive roles may be assigned to storage controllers with respect to connectivity between storage controllers and external storage devices. For example, if connected storage devices are externally located then connectivity status information may exist in a connectivity map between storage controllers on each of the storage management servers 120, 410, and 420 and external storage devices. Active and passive roles may be assigned to each storage controller on each storage management server for each set of connected storage devices.

The storage controller 120 is not limited to assigning the active role to either storage controller 122 or 124 for connectivity to the host machines 102, 104, and 106. In an embodiment, the current state of connectivity in the connectivity map may indicate that one of the storage controllers on storage management servers 410 and 420 has superior connectivity to host machines 102-106. The storage management server 120 may then assign the active role to one of the storage controllers located on one of the other storage management servers 410 and 420.

In other embodiments, the storage management server 120 may determine active and passive roles using the up/down status of connection pathways from network interfaces and other connection properties, such as connection speed or connection quality, to determine which storage controller is the active storage controller and which storage controller is the passive storage controller.

In yet other embodiments, the storage management server 120 may be configured to assign active roles to both storage controllers 122 and 124, based upon the current connectivity information in the connectivity map. For example, the connectivity information may indicate that both storage controllers 122 and 124 have connection pathways to host machines labelled as up. Therefore in order to increase bandwidth into the storage management server 120, the storage management server 120 assigns active roles to both storage controllers 122 and 124. Using this active/active set up, the storage management server 120 may be further configured to determine routes to direct traffic, based on the connectivity information, to each of the host machines.

Floating IP Address

In an embodiment, each of the network interfaces 132-138 attached to the storage controllers 122 and 124 are assigned an IP address. These IP addresses are used by the host machines to communicate with the storage controllers. In an embodiment, the storage management server 120 is configured to assign an additional IP address to one of the network interfaces. This additional IP address is a floating IP address that may be assigned to any one of the network interfaces at any time. The floating IP address is a virtual IP address that may be assigned to a physical location, such as a network interface, and then may be reassigned at any time to a different physical location, such as a different network interface. In an embodiment, the storage management server 120 is configured to assign the floating IP address to one of the network interfaces 132-138 based upon connectivity information from the connectivity map 305. The storage management server 120 may access the connectivity map to determine which network interface is associated with the most available connection pathways to host machines. For example, referring to the connectivity map 305, the storage management server 120 may determine that the floating IP address should be assigned to network interface 134 because connection pathways from network interface 134 to the host machines 102-106 are all up. The storage management server 120 may also use other connection properties associated with network interfaces and connectivity map 305 to determine where to assign the floating IP address. Additionally, the storage management server 120 may assign the floating IP address to a network interface that is attached to the specific storage controller that is currently active. Since the storage controller that is designated as active is likely the storage controller with the more available connection pathways, storage management server 120 may be configured to assign the floating IP address to one of the network interfaces on the active storage controller. For example, the storage management server 120 may first determine an active storage controller as storage controller 122. Then the storage management server 120 may determine to assign the floating IP address to the network interface that has better connectivity (either network interface 132 or 143). If the storage management server 120 determines that the active storage controller should be reassigned, then the storage management server 120 would assign the active role to storage controller 124 and then reassign the floating IP address to one of the network interfaces attached to storage controller 124 (either network interface 136 or 138) based on connectivity information.

In other embodiments, the storage management server 120 may determine the floating IP address assignment based solely on the connectivity map, which may include assigning the floating IP address to a network interface that is attached to the passive storage controller. Assigning the floating IP address to a network interface that is attached to the currently passive storage controller may trigger the storage management server 120 to reassign the active/passive roles of the storage controllers. For example, if the storage management server 120 determines that the floating IP address should be assigned to network interface 136, which is attached to passive storage controller 124, then the storage management server 120 may also switch the active/passive roles of the storage controllers so that storage controller 124 is now active and storage controller 122 is now passive.

The floating IP address may be used as a designated IP address for connection status queries. For example, host machines 102-106 may send connectivity status query requests to the floating IP address in order to receive connection status information related to which connection pathways are up and available for receiving data requests for the storage controllers.

Connectivity Status Queries

In an embodiment, the storage management server 120 is configured to initiate a connection status interface that is associated with the particular network interface where the floating IP address has been assigned. The connection status interface is programmed to receive connectivity status queries from host machines and other devices within the network, and query connection pathway information relevant to the host machine or other devices that sent the query.

In an embodiment, host machines 102-106 are configured to query the connectivity map 305 in order to determine which connection pathways are optimal for sending data requests to storage controllers. Host machines 102-106 are configured to generate a connectivity status request message which is used to query the connectivity map 305 for connection information relevant to the host machine. The connectivity status request message may include a connectivity status request and information identifying the host machine that is requesting the message. For example, if host machine 102 generates a connectivity status request message, then the connectivity status request message may include identifying information that identifies host machine 102. This identifying information may be used by the connection status interface at the storage management server 120 to query connection information that is relevant to host machine 102. After generating the connectivity status request message, host machines 102-106 are configured to send the connectivity status request message to the connection status interface using the floating IP address as the target IP address. In other embodiments, generating and sending connectivity status request messages is not limited to host machines 102-106. Connectivity status request messages may also be sent from other devices such as other storage controllers on storage management servers 410 and 420 for the purpose of determining connection pathways between different storage management servers.

In an embodiment, host machines 102-106 are configured to generate and send connectivity status request messages at: (1) regular time intervals, (2) upon initial startup of the host machine, and (3) after data requests failures. For example upon startup, host machine 102 is unaware of the current connectivity status of connection pathways within the network. Therefore host machine 102 is configured to generate and send a connectivity status request message to the connection status interface at the floating IP address in order to determine which connection pathways are available for use. Since the status of connection pathways may change from time to time, host machine 102 is configured to periodically generate and send a connectivity status request messages to the connection status interface in order to ensure that the connection status information within the host machine 102 is up-to-date. Additionally, the host machine 102 may also be configured to generate and send a connectivity status request messages after a data request failure. For instance, if host machine 102 sent a data request to the storage controller 122 using a particular connection pathway and the data request was not acknowledged, then the host machine 102 may conclude that the particular connection pathway used may currently be down. In this scenario, the host machine 102 may generate and send a connectivity status request message to the connection status interface in order to receive up-to-date connection status information.

Referring back to FIG. 2, at step 220 a connectivity status request message is received from a host machine. In an embodiment, the connectivity status request message is received by the particular network interface where the floating IP address is assigned. For example, if the floating IP address is assigned to the network interface 134, then the connection status request message is received at network interface 134. The network interface 134 receives the connection status request message, and routes the message to the connection status interface for processing.

At step 225, in FIG. 2, the connection status interface processes the connection status request message received, generates a connection status result set, and sends the connection status result set to the requesting host machine. In an embodiment, the connection status interface generates a connection status result set message containing connectivity status information relevant to the requesting host machine. For example, if the connection status request message was sent from host machine 102, then the connection status interface may query the connectivity map 305 for connection pathways that include the host machine 102 as an endpoint. The connection status interface then sends the connection status result set to host machine 102. In an embodiment, connection status result set may also include information that specifies which storage controller is currently active and which storage controller is currently passive.

Host machines 102-106 that receive connection status result sets may then use the connection pathway information to appropriately route data requests to the active storage controller. The active storage controller is then configured to send the data requests to the appropriate data storage device within storage pool 160.

In an embodiment, host machines 102-106 are configured to store the connection pathway information into a local cache store within the host machine 102. By storing the connection pathway information within local cache, the host machine 102 may determine the appropriate connection pathways to use for sending data requests to the active storage controller without having to send connectivity status request messages prior to each data request sent. Additionally, host machines 102, 104, and 106 may be configured to set a watch on connectivity information, such that if connectivity information changes within the connectivity map, then the storage controller 122 is configured to alert the host machines 102, 104, and 106 that the connection status is out of date. Then the host machines 102, 104, and 106 may be configured to send another connectivity status request message.

Generating Connection Status Lists

In an embodiment, the connection status interface may be configured to periodically query the connectivity map 305 to determine sets of connection pathways that are known to be down. For example, if network interface 132 is currently down, then the connectivity map 305 would indicate that connection pathways between host machines 102-106 to network interface 132 are down. The connection status interface may then compile a "blacklist" of down connections between network interfaces and host machines. The blacklist may contain a list of IP addresses of network interface-to-host machine pairs that are currently down. The connection status interface may then be configured to send the generated blacklist to host machines 102-106 so that host machines 102-106 may update their local cache of connection pathway information.

In an alternative embodiment, the connection status interface may also be configured to periodically query the connectivity map 305 to determine connection pathways that are currently up. The connection status interface may compile a "whitelist" of IP addresses of network interface-to-host machine pairs that are currently up and should be used for data requests from host machines 102-106 to the active storage controller.

Host machine 102-106 may be configured to update their connection pathway information stored in their local caches based upon the received blacklist or whitelist. Additionally, in response to receiving either a blacklist or whitelist message, host machine 102-106 may be configured to generate and send a new connection status request message. For example, host machine 102 may receive a blacklist of network interface-to-host machine pairs which after updating the local cache may leave host machine 102 without a clear connection pathway to send data requests to the active storage controller. In this scenario, host machine 102 may send a new connection status request message, to the floating IP address, in order to receive a result set of connection information that specifies all connection pathway status information related to host machine 102.

In an embodiment, storage management server 120 may be configured to generate a health status report based upon the connection information within the connectivity map 305. The health status report is a connection status report that is generated for system administrators and other network engineers who monitor the state of the network. For example, if connections between one or more storage controllers and host machines 102-106 are down, then the health status report may be used to alert system administrators of any potential emergency. In an embodiment, the health status report may be triggered by any change in the connectivity map 305. For example, if a whitelist or blacklist is generated, a health status report may also be generated containing the details of the health status report. In another example, the health status report generation may be triggered by a threshold number of connection pathways changing status.

In an embodiment, the storage management server 120 may be configured to generate different types of health status reports. For example, the storage management server 120 may create a periodic health status report, a high priority health status report based on specific blacklist or whitelist triggers, and customized health status reports that are specific to connections between host machines, storage management servers, or replication sites.

Updating Connectivity Map

In an embodiment, storage controllers within storage management servers 410 and 420 may be configured to send test messages to host machines 102-106, and other storage controllers and receive response messages from host machines 102-106, and other storage controllers. Upon receiving response messages, storage management servers 410 and 420 may be configured to generate and send connectivity map update messages to storage management server 120. Connectivity map update messages may contain connectivity information including, but not limited to, connectivity status information, latency information, and connection error information related to connection pathways and test and response messages. In an embodiment, the storage management server 120 may be configured to receive the connectivity map update messages and update the connectivity map 305 accordingly.

In addition to receiving connectivity map update messages from storage management servers 410 and 420, the storage management server 120 may be configured to receive connectivity map update messages from host machines 102-106. In an embodiment, host machines 102-106 may be configured generate and send test messages to storage controllers and receive response messages from storage controllers. The ability to send test messages and receive response messages at host machines 102-106 allows for asymmetric connection path monitoring. The host machines 102-106 may be configured to test directional connection pathways from the host machines to the storage controllers, while the storage controllers may be configured to test directional pathways from storage controllers to host machines. Directional connectivity and connection speed may then be sent to the storage management server 120 using the connectivity map update messages. The storage management server 120 may then be configured to update the connectivity map 305 to include directional connection pathway information.

Distributed Virtual Array

Figure 5:
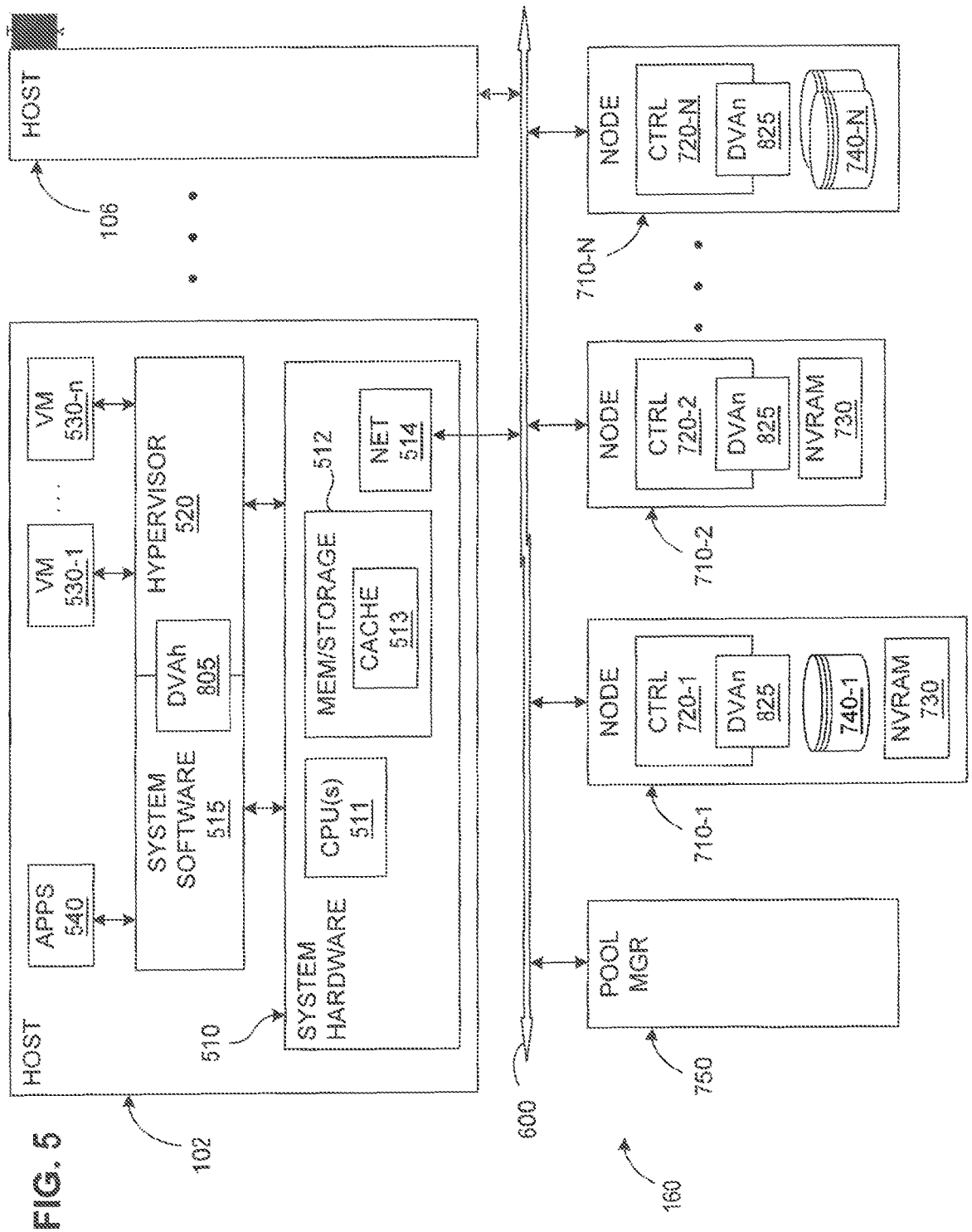
FIG. 5 depicts an embodiment of a Distributed Virtual Array (DVA) system.

FIG. 5 shows a general embodiment of a DVA and illustrates the relationship between two main physical "sides" of the DVA: any number (including one) of hosts 102, for example, servers, and a storage storage pool 160, which includes storage nodes 710-1, 710-2, . . . , 710-N (collectively, "710"), which from the perspective of the hosts, may form a single yet distributed storage system. Entities within the hosts 102 write data that is first stored in non-volatile memory (shown as NVRAM 730) and ultimately stored in persistent storage devices 740-1, . . . , 740-N (collectively, "740") located in the nodes.

The reading and writing entities may be of any type, including virtual machines 1030 (shown separately as "VM"s 1030-1, . . . , 1030-$n$) or more general, non-virtualized processes such as user-level applications 540. Software and hardware entities that need to read and/or write data are referred to here as "clients".

Each host includes system hardware 510, including one or more processors (CPUs) 511, and some device(s) 512 for non-persistent, volatile and/or persistent, non-volatile, non-transitory storage of data and/or code that may execute on the CPU(s). Traditionally, there is a relatively clear technical distinction between "memory" and "storage", since the former has typically comprised fast, volatile, solid-state devices, whereas the latter have generally comprised slower, non-volatile, mechanical or opto-mechanical devices. With the wide-spread use of modern technologies for bulk, persistent storage, however, this distinction is becoming increasingly less clear. For example, many modern servers use various solid-state storage devices (SSDs) such as "server flash" to increase throughput and speed, which is commonly measured in terms of TOPS (Input/Output Operations Per Second), especially for non-contiguous storage locations. Emerging technologies such as phase-change memory (PRAM) are further blurring the distinction. No specific type of host-side storage or memory technology is required to implement the embodiments described here, and it is not necessary for every host to employ the same storage technology.

The hardware 510 will include other conventional mechanisms such as a network connection device 514 for transfer of data between the various components of the system over one or more network(s) 600, which may be any known public or proprietary local or wide-area network such as the Internet, an internal enterprise network, etc. The only requirement is that, whatever network(s) is/are used, all clients are able to access the storage nodes (see below) they need to access. "The" network 600 is therefore to be read as the collection of whichever networks are implemented, along with any necessary switching or other communications devices if data needs to pass between different networks.

Each host will also include conventional system software 515 such as, depending on the implementation, an operating system (OS), device drivers, etc. In the illustrated configuration, one of the hosts 102 is shown as supporting a virtualization platform, which will typically include some form of hypervisor 1020 or similar interface layer between the system hardware 510 and (in the illustrated embodiment) at least one virtual machine (VM) 1030-1, . . . , 1030-$n$. As is well known, VM is a software abstraction of an actual physical computer system.

The VMs are shown in FIG. 5 within the host merely for simplicity—in most implementations, a virtual machine is a "guest" that is running on the hypervisor/hardware host. In some virtualized systems, a "virtual machine monitor" is included as an interface to underlying software layers, such as the hypervisor or a host OS. Many hypervisors, such as the ESX Server family of products of VMware, Inc., run directly on "bare metal", that is, directly on the system hardware 510, with no need for interaction with a host OS. In other virtualization platforms, the hypervisor may run on or at the same level as the host OS, which supports and performs some operations upon calls from the hypervisor. The various embodiments of the invention described here are not dependent on any particular virtualization architecture, whether for the VMs, the hypervisor(s) or other virtualization layers. Indeed, VMs are not presupposed at all; rather, all that is assumed is some system software layer that processes data storage read/write requests from software and hardware entities ("clients"). A "host" is thus any platform on which processes (of which VMs are a special case) run that may wish to write data to and/or read data from the distributed storage arrangement described below.

Although the various storage nodes 710 in the storage pool 160 are shown as distinct units and may be different physical servers, they may be considered to lie within a single logical boundary for purposes of addressing. The logical, conceptual boundary of the addressable storage pool may, however, also include storage components and processes that extend beyond the illustrated set of physical storage nodes 710-1, 710-2, . . . , 710-N.

Depending on the desired DVA features, a Pool Manager 750 may also be included to handle some distribution and control functions for the nodes 710, to maintain administrative and other data common to the nodes 710, etc. Such a Pool Manager may run within one or more of the storage nodes, within one or more of the hosts, or in a separate computing system attached to the same network. Although they may also be implemented as independent entities, the Pool Manager may also include other managerial components, such as for managing a file name space for files (such as virtual disks) stored within the pool, for cluster management, and for other node-management functions.

Two of the many currently available examples of possible choices to implement a storage node could be a Xyratex chassis with multiple disk controllers, or a single-disk "FAWN" (Fast Array of Wimpy Nodes), which is a low-power server architecture for intensive input/output tasks. More generally, the nodes can be implemented using any form of computer that communicates with at least one disk over any form of bus or network connection. Indeed, a node could itself even be an entity that writes data to the storage pool.

Each node contains one or more storage controllers 720-1, 720-2, . . . , 720-N (collectively, 720) each of which comprises conventional processing circuitry to control one or more disks, flash or other SSD devices or other devices comprising the persistent storage devices 740 (which comprises more than one physical device). The controller also contains the circuitry necessary to connect to the network 600. In some embodiments, the controller may be integrated with the storage device in single composite module. As with the host 102, the various software components used within the nodes of the storage pool 160 will be loaded and/or stored in any conventional method so as to be executable on the processor(s) on each hardware platform within the pool; these media and processor(s) are not illustrated separately in the figures for the sake of simplicity—skilled programmers will of course know these will be present. So far, the system components described are also found in many prior art systems.

In the preferred embodiment, at least one of the controllers 720 also includes, or is able to access, some non-volatile memory 730 (NVRAM—FIG. 6) to receive and persistently store newly written data with very low latency. In some systems, the NVRAM may be on a special card in a PCIe slot. In some implementations, the controller may have a battery backup; on power failure, the controller will then have enough time to copy a portion of system memory to a flash drive. In this case, the NVRAM 730 need not be a separate physical component but may instead a logical portion of the general purpose RAM that will be within the controller for other, standard purposes. In some systems, the NVRAM may just be a low-latency SSD. Not all implementations of embodiments of the invention require nodes to have both disks and NVRAM; rather, any given node may be configured to have or at least be able to access only one of these two types of persistent storage devices. Thus, as FIG. 5 illustrates, it is possible to implement the system such that one or more nodes may have both persistent storage device(s) and non-volatile memory (node 710-1, for example), while one or more other nodes may not include the persistent storage device (node 710-2, for example), and still other node(s) may not have a non-volatile memory component 730 at all. As FIG. 5 also illustrates with node 710-N, it is possible to one or more nodes to have more than one persistent storage device (740-N). Moreover, in some embodiments, the NVRAM may be in a host.

In the preferred embodiment, the host is able to write data over the network specifically to the NVRAM in a storage node or host, distinct from writing to a persistent storage device, and may also give commands to remove data from said NVRAM. This in contrast to the configuration in traditional storage systems in which the NVRAM is a transparent buffer for data on its way to a persistent storage device.

As mentioned above, two dominant storage philosophies fall near different ends of the trade-off spectrum: In hyper-converged systems, substantially the entire storage and computation burden is concentrated within interdependent hosts, whereas in other systems, most of the computational load is placed on the remote storage units themselves and the hosts do not depend directly on each other. Embodiments of the invention employ a different approach, in which the usually greater computational resources of hosts are used for many storage-related functions, but used in a way that does not require significant inter-host communication and coordination, and in which the main storage capability remains primarily in the remote nodes where any host can access it without going through another host.

To this end, the hosts and the nodes include respective DVA components—a DVAh 805 module at the system software level, and DVAn 825 in the nodes. As FIG. 5 illustrates by overlapping, the DVAh 805 may be implemented as part of the system software 515, as part of the controlling software (such as the hypervisor 1020) of the virtualization platform, or with cooperating components in both. Options include configuring the DVAh component as a driver within the system software 515, or within the hypervisor 1020, with call-outs as needed to the host operating system (system software). It would also be possible to configure the DVAh 805 component within a different user- or system-level process, or even within a "helper" VM. Regardless of the configuration of the DVAh and DVAn, they will generally be implemented as corresponding bodies of processor-executable code that is stored in non-transitory storage and loaded into memory for execution by the host CPU(s) 511.

Similarly, the DVAn 825 components in the nodes may also be implemented as software running on the respective storage controllers 720, or as software modules separate from but coordinating with the storage controllers, and will also be implemented as corresponding bodies of processor-executable code that stored in non-transitory storage and loaded into memory for execution by the processor(s) in the nodes 710.

In an embodiment, storage controller 720 manages data encryption by distributing encryption keys to the DVAh 805 located on hosts. In order to maintain security, encryption keys used by hosts may be rotated periodically. The storage controller 720 maintains an encryption table that contains multiple encryption keys that may be used by different hosts at different times for data encryption. In an embodiment the encryption table contains columns specifying an encryption key value and an encryption index value used to identify the encryption key value. When the storage controller 720 sends an encryption key value to the DVAh 805 on a particular host, the storage controller 720 sends the encryption key value along with the encryption index value. The encryption table may also include a column that specifies the encryption algorithm associated with the encryption key. By storing the encryption algorithm in the encryption table, the storage controller 720 may support different types of encryption algorithms and may allow changing the type of encryption algorithm used to encrypt data by simply sending the encryption key value, the encryption algorithm type, and the encryption index value to the DVAh 805. In an embodiment, one or more modules within the DVAh 805 are configured to manage encryption of data by receiving the encryption key value from the storage controller 720.

A cache 513 is preferably included in at least one host, preferably as part of the memory/storage component(s) 512. The cache may be implemented using any conventional, sufficiently fast technology, such as by using one or more Flash memory device(s), phase-change random access memory (PRAM), a portion of the main system memory, etc. The cache may also be implemented as a separately packaged, Solid-State Disk (SSD), a circuit card plugged into a bus within the server, as a module on the server motherboard, etc.

Figure 6:
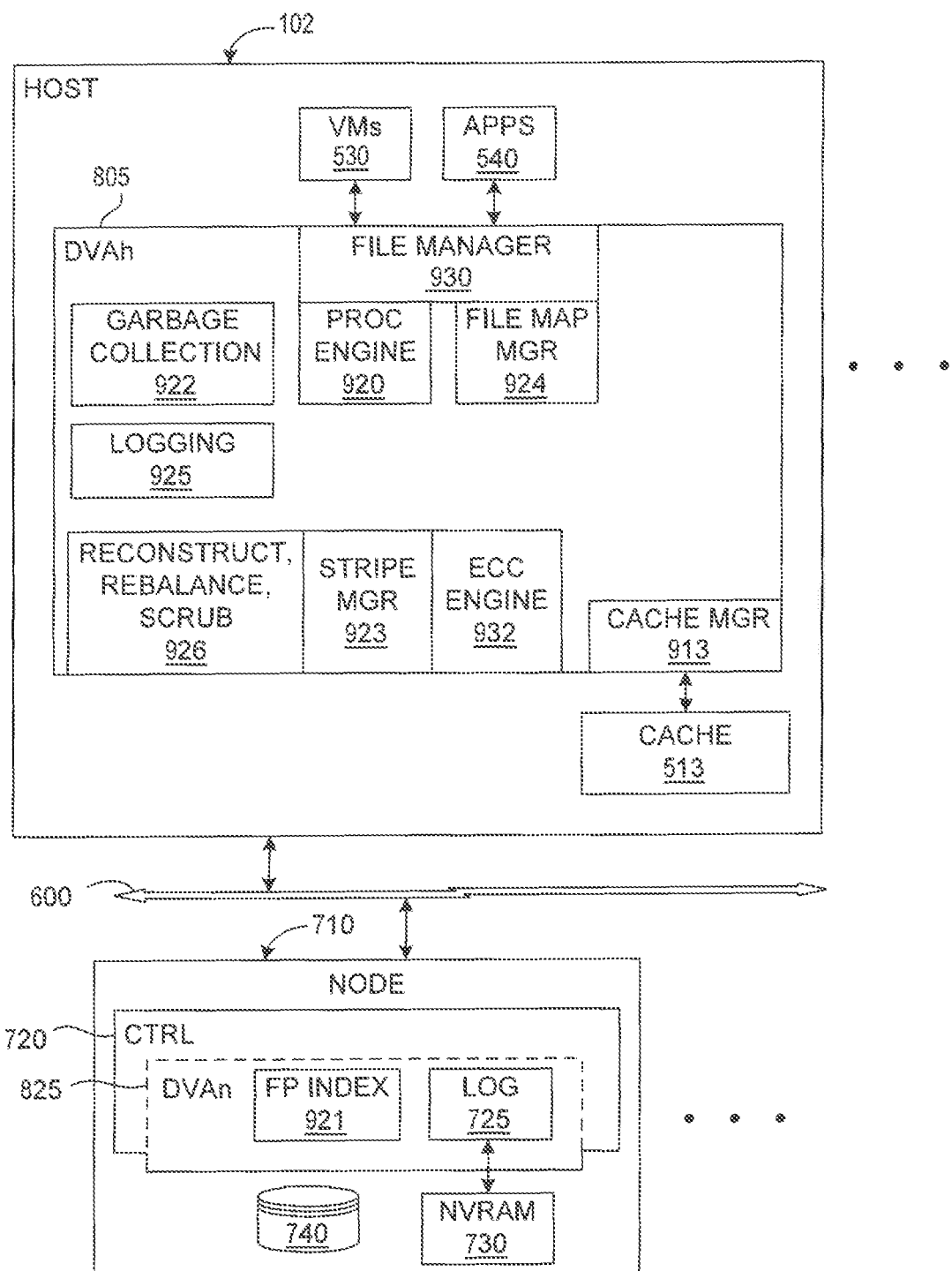
FIG. 6 depicts a detailed embodiment of select components within the DVA.

FIG. 6 is a simplified representation of the main system components shown in FIG. 5, but with more detail of various optional sub-components of the DVA modules. Although only one host and one node are shown, similar sub-components may be included in other hosts/nodes as well. Note that it will not be necessary for all hosts or nodes to include the same DVA sub-components as the one illustrated in FIG. 6; within any given host, any number (from one to all) of the illustrated sub-components may be included, in any desired combination, depending on the needs of any given implementation. The set of DVA sub-components shown in FIG. 6 is therefore for purposes of illustration and explanation only. Furthermore, although the various sub-components are shown as being separate in FIG. 6, this is for purposes of illustration and explanation only—any or all of them could be combined into unitary bodies of executable code.

The DVA sub-components and their functions perform any or all of various storage processing functions, including background storage management functions, data transformation functions, and/or other functions outlined below. Note that on traditional storage systems, these functions are typically performed within the storage controllers and not in the hosts. The DVAh sub-components preferentially include:

A cache manager 1013, which handles reads and writes to the cache 513 using known techniques. In one embodiment, the cache comprises data blocks which have been fingerprinted such that it is possible to find blocks within the cache based on the fingerprint for the block.

A file manager component 1030, which receives data from VMs (or other processes, virtualized or not) on the host and processes it to whichever format has been architected for storage in the storage pool 160. It also receives requests to read data and it retrieves data from the cache or pool, processes it to return it to its originally stored format, and returns the requested data. The file manager may invoke other components to help it cache, process, store, or retrieve data.

The file manager 1030 may invoke a mapping module 1024, which updates maps from a file offset to a reference to the corresponding data item stored in the storage pool 160. In some embodiments, that data item reference comprises a fingerprint of a block that includes the data item. In some embodiments, the host computes the fingerprint. In some embodiments, the data item reference comprises a locator for the data item. To satisfy a read request for some offset in a file, the file manager invokes the mapping module 1024 to obtain the reference to the data item stored for that offset in the file. It may then use that reference to retrieve the data item from the cache, or, if the data item is not there, it may retrieve the data item from the pool.

As is well known, the storage system of a virtual machine is also virtualized. Processes running on a VM therefore address what they "think" is physical storage, but in fact is a virtual address in a "virtual disk" (vDisk), which then undergoes one or more levels of address redirection using corresponding address maps, leading ultimately to an address in physical space. In the context of a distributed storage system, VM reads and writes are ultimately mapped to the corresponding address in one (or more, for example, if data is mirrored) physical storage devices in the storage pool 160.

A Data Processing component—the processing engine 1020—is preferably included to perform any or all of such known data-transforming functions as compression, encryption, checksums to ensure data integrity, packing of received data into erasure-coded stripes, for example, computing error-correcting code (ECC) values as part of RAID stripes, and/or computing fingerprints, that is, unique identifying information for received data blocks. One example of a possible fingerprinting technique is hashing, such as using any of the SHA methods (for example, SHA-1). Assuming that the chosen fingerprinting method is sufficiently collision resistant (that is, the probability of two different inputs yielding the same fingerprint output is sufficiently low), different data blocks having the same fingerprint may then be presumed to have the same content and therefore be duplicates.

In one embodiment, incoming data is fingerprinted and deduplicated by comparing the fingerprint of the incoming block to the fingerprints of the blocks stored in the cache 513, that is, within the host 102; this avoids the need to analyze and dedupe data stored in the storage pool 160. Not only does this arrangement allow these computationally intensive tasks to be performed in the usually more powerful host, but it also avoids most of the latency that would otherwise be experienced if the host would first have to retrieve the fingerprint from the more remote storage nodes 710.

A cache of fingerprinted blocks can also avoid the latency of fetching a data block from the pool in response to a read request. Two distinct files may each include a block with the same content and therefore the same fingerprint. The duplicate block may have been inserted in the cache 513 to satisfy a read or write request for one file and a subsequent read request for the duplicate block in another file may be satisfied from the cache without incurring the latency of fetching the block from the pool.

Fingerprinting or checksums may also be used to ensure data integrity and to detect incomplete writes. For example, fingerprints may be computed for buffered data. If there is any indication of possible host failure and incomplete write, the fingerprint of the present data may be compared with that of the buffered data—if the values are not the same, then the system will know the write was incomplete since the buffered data will not be identical to the data intended to be stored.

In a DVA that uses a log-structured filesystem, a garbage collection module 1022 may be included to perform conventional garbage collection functions including, in some embodiments, identifying data to be copied forward and, in some embodiments, copying such data into new stripes.

In systems in which data is stored using stripes, a stripe manager 1023 may be included. The stripe manager may use or include an ECC engine 1032 to compute ECC values, which it adds to a stripe that it distributes across multiple storage nodes according to whatever mapping or allocation scheme that the designer chooses to implement.

A module 1026 may also be included in the host to perform such functions as data reconstruction (for example, of missing RAID stripe elements from ECC information), data rebalancing, or data scrubbing to ensure data integrity, etc. This module, or one or more other host modules, may also perform such operations as prefetching data into the host flash cache; forming data clumps and deduping at that granularity and then repacking such clumps, handling host flash failures, updating vDisk maps on the host, etc.

The DVAn sub-components may include:

A fingerprint index 1021 to map from fingerprints to data block locators or other identifiers. When a host stores fingerprinted data blocks in stripes and writes the stripes to the pool, it communicates the fingerprints and corresponding data block locators to the fingerprint index. When a host needs to read a fingerprinted block from the pool, it first requests the block locator from the index and then reads the block from the pool. The index 1021 may be implemented in the host but is preferably implemented in the controller 720—because the size of the index is proportional to the storage capacity, it will generally be most efficient to bundle the memory for the index with its corresponding storage unit.

A log 725 that receives recently written data and other events from a logging module 1025 on a host and stores that data in a non-volatile, low latency NVRAM module 730. The NVRAM module 730 is shown in FIG. 6 as being internal to the node 710, but this is just one implementation example. Other possibilities include putting the NVRAM module 730 within a different, dedicated node, or in any other location. By storing recently written data as a log or otherwise in the NVRAM, the write can be acknowledged as "safe" without incurring the latency of a write to a higher-latency device 740 such as a disk drive. By storing such data external to the host, including the log 725, if the host fails before storing it to a permanent location in one of the storage devices 740, another entity (such as one of storage nodes, one of the hosts that has not failed, or any other entity besides the host that originally received data) can read data from non-volatile device 730 and re-process the data to store it in one of the storage devices 740. This would not be possible if the only copy of the data were internal to the host in a cache 513 that was only accessible via the now-failed host.

One other advantage of including the NVRAM module 730 and exposing it to the hosts via an interface such as LOG 725 is that the host can make the data "safe" by writing it to NVRAM on a storage node allowing quick acknowledgement and then leverage its computing resources for further and possibly delayed storage processing, for example, after enough data is batched to form a stripe, etc. In some embodiments, some of the data written to the NVRAM may never be written to a persistent storage device without further storage processing by host. In some embodiments, the data may be written to multiple NVRAM devices to protect against the failure of one of the NVRAM devices or the controller it is connected to. The host may itself write to multiple NVRAM devices, or a controller may mirror a single host write to multiple NVRAM devices or to a plurality of other controllers and their NVRAM devices either in the same or a different node.

By way of example, assume that a VM wishes to write data to at least one virtualized disk vDisk or file. If the host on which the VM is a guest fails, a copy of the newly written data will survive in the log and NVRAM on some storage node. The Write data may also be buffered in the file manager or stored in the cache 513 of the VM host until there is enough data to complete some minimum storage unit, such as (for example, in RAID-like systems) a full stripe, before the data is written to the pool, possibly including to one or more storage nodes that did not hold log data for the write. New Write data can also be buffered on the VM host for even longer periods to give time for later overwrites of the same location in a vDisk, which eliminates the need to write out the overwritten data in a stripe. The host—either as part of the DVAh component, or some other host entity, such as in its operating system, may also compute at least one erasure coded block for the Write unit and then write it to a storage node.

If the operation is a READ, the desired data may be looked up in the cache 513. If the data is cached, it may be read from the cache and returned to the requesting process, such as a VM. If the data is not cached, it may be read directly from the storage node (using any intermediate address maps), and returned to the requesting process. The READ data may also be written to the cache.

By concentrating the management and computational burden in the host, the storage nodes can be kept relatively simple, and inexpensive, with no need for dedicated backplanes and fibre channel connections on the storage side; moreover, the entire storage side may communicate with the hosts directly via a standard network connection. Further, if the hosts communicate with the pool, but only infrequently with each other, then one host does not suffer from a noisy neighbor on another host. Finally, if the hosts include a large cache, then they will only infrequently have to contact even nodes in the pool, which further reduces the noisy neighbor problem. Hosts are empowered to serve data to the VMs and applications running within them and so are less susceptible to performance issues elsewhere in the system.

It should be noted that the various functions or processes disclosed herein may be described as data and/or instructions embodied in various non-volatile, computer-readable media, which may be provided as a computer program product to those wishing to implement embodiments of the DVA system.

Figure 7:
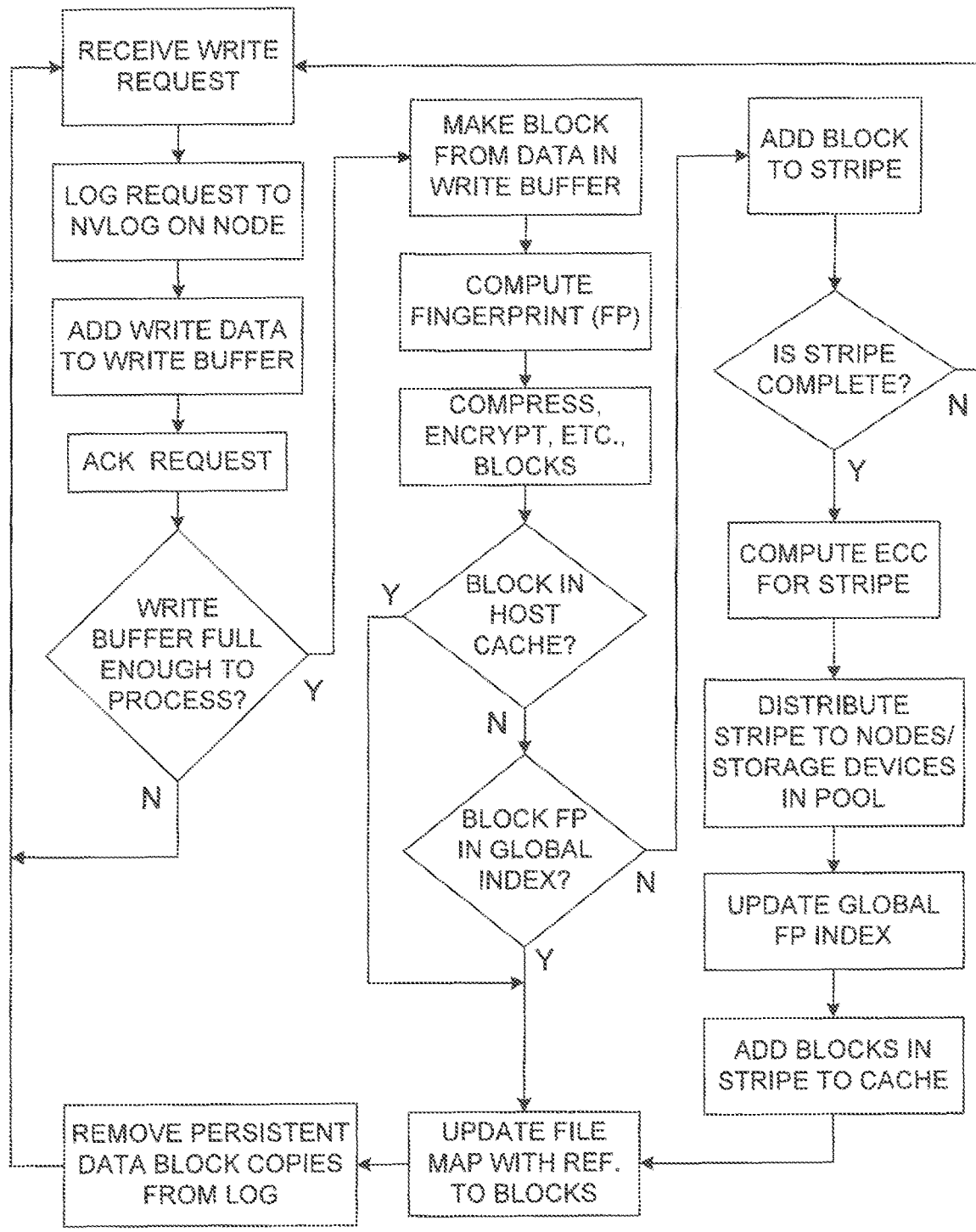
FIG. 7 depicts an embodiment of the workflow upon receipt of write requests.

FIG. 7 illustrates one implementation of processing write requests: When a write request is received, the request is logged to the NVRAM module 730 on a node. Logging the write includes an indication of the file and offset within the file being written. The write data itself is written to the write buffer and the request is acknowledged. If the write buffer is not full enough to trigger processing, for example, enough to form a block, then the processing will return to receive more write requests; otherwise, the written data may be formed into blocks and one or more fingerprints may be computed (depending on whether a single fingerprint is used for the entire data set or separate fingerprints are used per block). Either before, after, or at the same time as the fingerprint computation, the block data may also be processed, such as by compression, encryption, etc. If a given block is already in the host cache (which can be determined by fingerprint comparison), then a file map may be updated with references to the blocks and the processing may return to receive additional writes. If the block's fingerprint is not found in host cache or the global fingerprint index 1021, the block is added to the stripe currently being constructed. If the stripe is not yet complete, the system may return to receive additional write requests. If the current stripe is complete, an ECC stripe element is computed for it and it can be distributed for storage. The fingerprints for the blocks in the stripe are then added to the global fingerprint index 1021. The blocks can then also be added to the cache, after which, the file map is updated to reference the blocks as stored in the stripe. At this point the written data is safe in the face of a host failure so the temporary copy of the data in the NVRAM is no longer needed. The host, using, for example, the logging module 1025, may therefore communicate to the log 725 that it may truncate the data and remove it from the NVRAM. Note that the controller need not itself rewrite the data temporarily stored in NVRAM in a more permanent location. Finally, processing returns to receive additional writes. In other embodiments, the DVAh components compute a fingerprint and check for presence of that fingerprint in the host cache and/or global fingerprint index and, for the corresponding file and offset within the file, log to the remote NVRAM only a new reference to previously stored data instead of the data itself before acknowledging the write.

Figure 8:
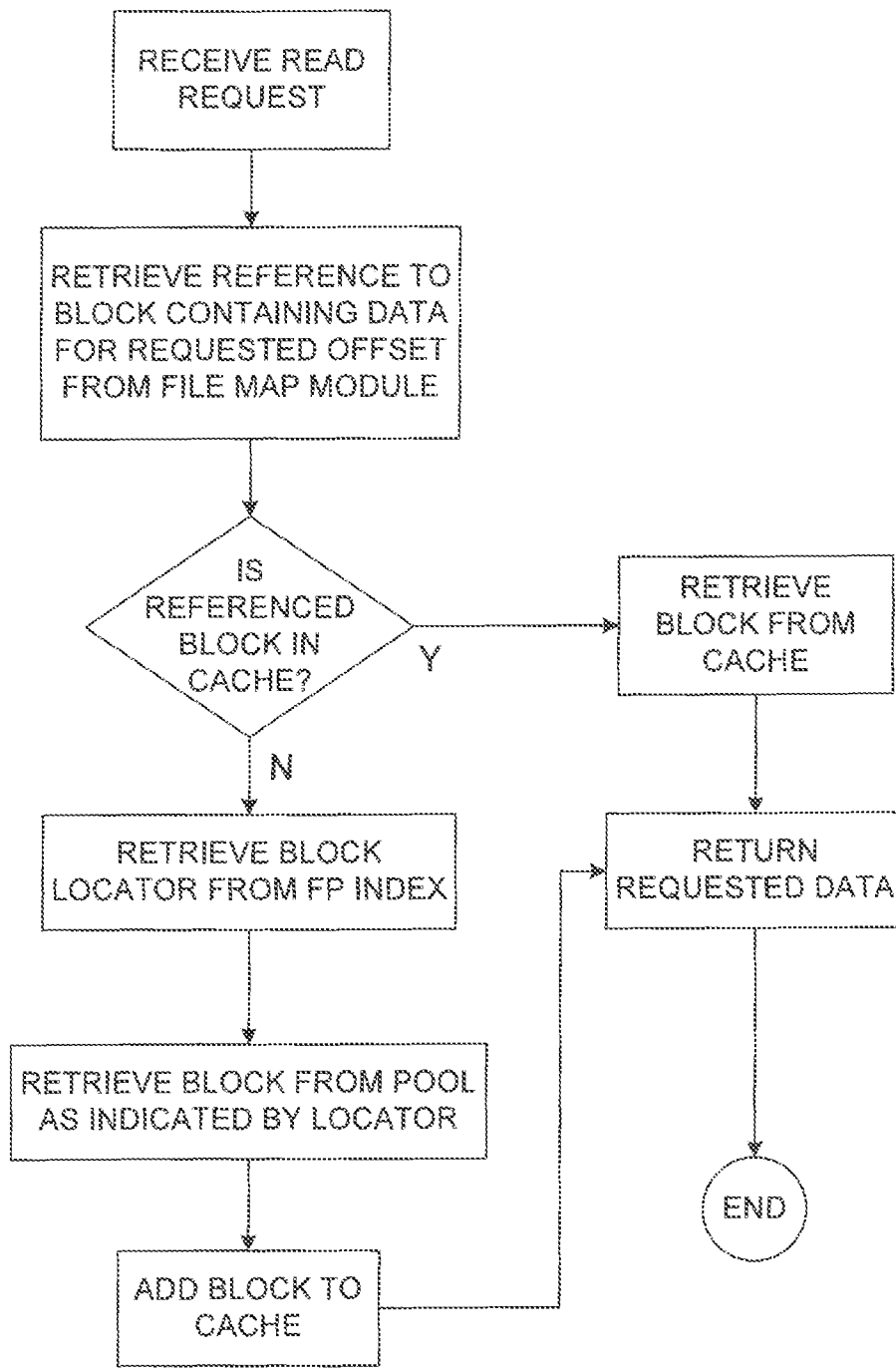
FIG. 8 depicts an embodiment of the workflow upon receipt of read requests.

FIG. 8 illustrates another implementation of processing write requests: When a write request is received, the request is logged to the NVRAM module 730 on a node and the request is acknowledged. Logging the write includes logging an indication of the file and offset within the file being written. If the write data does not completely cover a data block, the remaining parts of the block may be read from the host cache and/or the pool and merged with the write data to form a write block. The block may be processed, such as by compression, encryption, etc. before being logged to the NVRAM module 730. Fingerprints may also be computed on the unprocessed block to enable deduplication. If a given block is already in the host cache (which can be determined by fingerprint comparison), then a file map may be updated with references to the blocks and the processing may return to receive additional writes. If the block's fingerprint is not found in host cache or the global fingerprint index 1021, the block is added to the stripe currently being constructed. If the stripe is not yet complete, the system may return to receive additional write requests. If the current stripe is complete, an ECC stripe element is computed for it and it can be distributed for storage. The fingerprints for the blocks in the stripe are then added to the global fingerprint index 1021. The blocks can then also be added to the cache, after which, the file map is updated to reference the blocks as stored in the stripe. At this point the written data is safe in the face of a host failure so the temporary copy of the data in the NVRAM is no longer needed. The host, using, for example, the logging module 1025, may therefore communicate to the log 725 that it may truncate the data and remove it from the NVRAM. Finally, processing returns to receive additional writes.

FIG. 8 illustrates one implementation of processing read requests: A read request is received and the reference to the block containing the data is retrieved from file map module, which will provide the requested offset. If the referenced block is in the cache 513, it may be retrieved and the data can be returned to fulfill the read request. If the block is not in the cache, it must be retrieved from the pool. This can be achieved by retrieving the block locator from the fingerprint index. Once the block is retrieved, it may be added to the cache, and the requested data may be returned.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
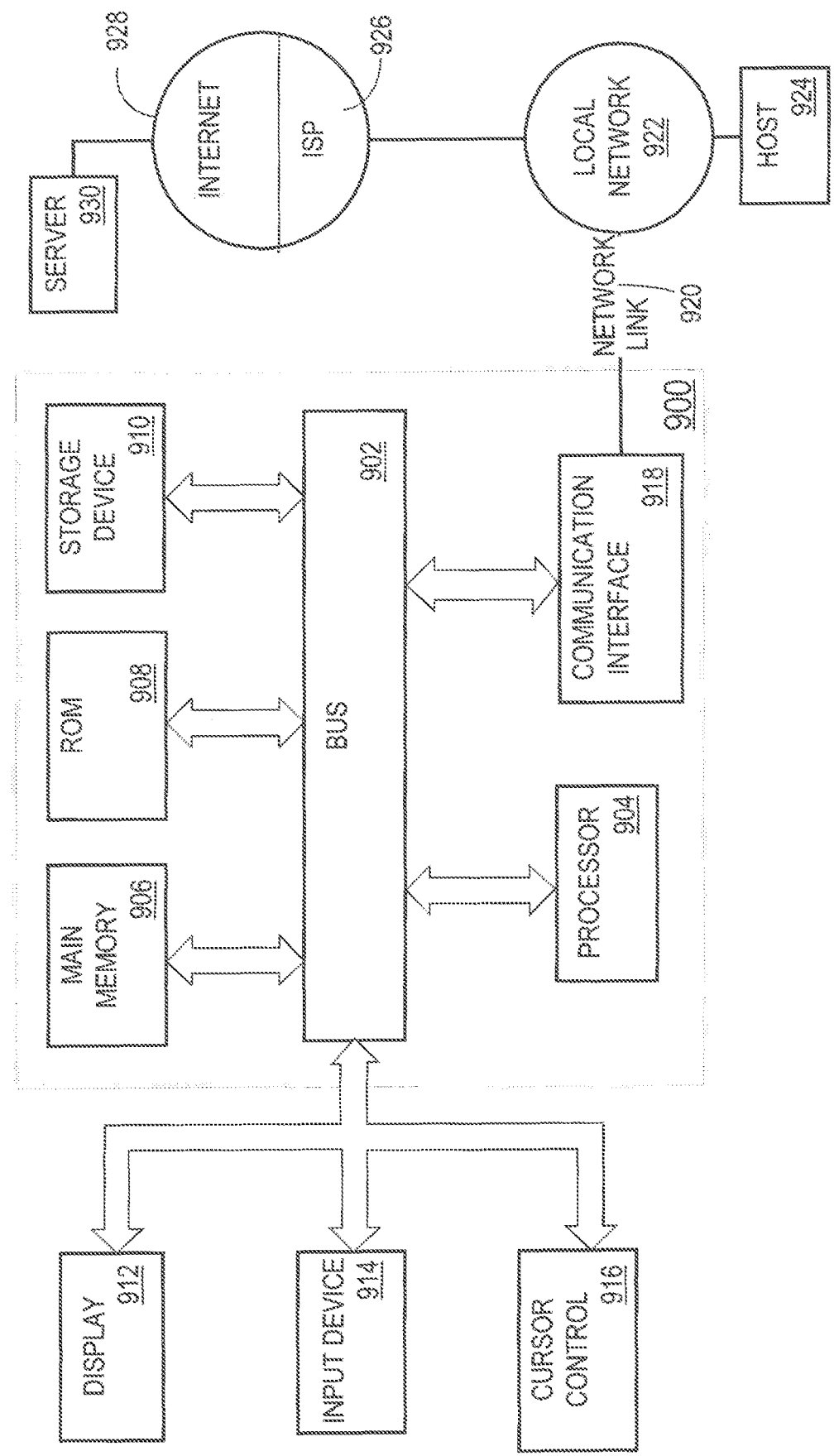
FIG. 9 is a block diagram that depicts an example computer system upon which embodiments may be implemented.

For example, FIG. 9 is a block diagram that illustrates a computer system 900 upon which an embodiment may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    sending storage node messages to each host machine of a plurality of host machines, from each network interface of a plurality of network interfaces on a particular storage node;
    wherein the particular storage node is operatively coupled to one or more storage devices that are accessible to each host machine that has connectivity to any one of the plurality of network interfaces;
    wherein the plurality of network interfaces includes at least two network interfaces of a particular storage controller of the particular storage node;
    in response to the storage node messages, receiving, by the particular storage node, host messages from at least one host machine of the plurality of host machines;
    determining, by the particular storage node, network-interface-to-host-machine connectivity information between each network interface of the plurality of network interfaces and each host machine of the one or more host machines, based upon the storage node messages sent from each network interface of the plurality of network interfaces and the host messages received from the at least one host machine;
    generating, by the particular storage node, a connectivity map containing the network-interface-to-host-machine connectivity information determined from the storage node messages sent from each network interface of the plurality of network interfaces and the host messages received from the at least one host machine;
    wherein the network-interface-to-host-machine connectivity information indicates that connectivity between a particular network interface of the plurality of network interfaces and a particular host machine of the one or more host machines is down if a particular number of storage node messages is sent from the particular network interface to the particular host machine without receiving a host message from the particular host machine;
    wherein the network-interface-to-host-machine connectivity information includes latency information between each network interface of the plurality of network interfaces and each host machine of the one or more host machines, wherein latency information is based on a duration of time between sending a particular storage node message and receiving a particular host message as a response to the particular storage node message;
    receiving, at the particular storage node, a connectivity status request from a particular host machine of the plurality of host machines;
    in response to the connectivity status request, the particular storage node providing network-interface-to-host-machine connectivity information between each network interface of the plurality of network interfaces and each host machine of the one or more host machines to the particular host machine;
    based on the network-interface-to-host-machine connectivity information received from the particular storage node, the particular host machine selecting a target network interface, of the plurality of network interfaces, for sending a request for data to the particular storage node;
    sending, by the particular host machine, the request for data to the selected target network interface; and
    receiving, at the selected target network interface of the plurality of network interfaces, the request for data that is stored on the one or more storage devices.

2. The method of claim 1, wherein the one or more host machines comprise one or more host network interfaces, each capable of sending host messages and receiving storage node messages.

3. The method of claim 1, further comprising:
    generating, by the particular storage node, a blacklist of down connection paths of network interface-to-host machine pairs, wherein the blacklist of down connection paths comprises a set of network interface-to-host machine pairs that have been determined to be down for a particular period of time based upon the connectivity map; and sending, by the particular storage node, the blacklist of down connection paths to the one or more host machines.

4. The method of claim 1, further comprising:
generating, by the particular storage node, a whitelist of up connection paths of network interface-to-host machine pairs, wherein the whitelist of up connection paths comprises a set of network interface-to-host machine pairs that have been determined to be up for a particular period of time based upon the connectivity map; and
sending, by the particular storage node, the whitelist of up connection paths to the one or more host machines.

5. The method of claim 1, wherein the storage node messages are a first type of test messages that are used to determine whether connectivity is capable sending a first type of data packets between each host machine of one or more host machines and each network interface of the plurality of network interfaces, and wherein the first type of test messages is scheduled to be sent to the one or more host machines a first threshold number of times, wherein the first type of test messages is a large sized message and the first type of data packets is a large data packet.

6. The method of claim 1, further comprising:
associating, by the particular storage node, a floating IP address with a physical address associated within the particular network interface;
receiving, at the particular network interface associated with the floating IP address, a request from a particular host machine, of the one or more host machines, for the network-interface-to-host-machine connectivity information related to the particular host machine from the connectivity map; and
in response to the request from the particular host machine, sending the network-interface-to-host-machine connectivity information to the particular host machine to enable the particular host machine to select a particular target network interface, from among the plurality of network interfaces, to which to send requests for data that is stored on the one or more storage devices.

7. The method of claim 1, further comprising:
wherein the particular storage node is a first storage node of a plurality of storage nodes and the plurality of network interfaces is a first plurality of network interfaces;
sending additional storage node messages to each host machine of the one or more host machines, from each network interface of a second plurality of network interfaces on a second storage node;
wherein the second storage node is operatively coupled to the one or more storage devices that are accessible to the one or more host machines through any one of the second plurality of network interfaces;
receiving, by the second storage node, second host messages from at least one host machine of the one or more host machines; and
updating, by the second storage node, the connectivity map to include information about connectivity between each network interface of the second plurality of network interfaces and each host machine of the one or more host machines, based upon the storage node messages sent from each network interface of the second plurality of network interfaces and the second host messages received from the at least one host machine.

8. The method of claim 1, further comprising generating, by the particular storage node, a connection status health report of the network-interface-to-host-machine connectivity information for connections of network interface-to-host machine pairs, wherein the connection status health report comprises a set of network interface-to-host machine pairs and the network-interface-to-host-machine connectivity information for each network interface-to-host machine pair in the set of network interface-to-host machine pairs that describes whether the connection is up or down and connection quality based upon the connectivity map.

9. The method of claim 8, wherein generating the connection status health report is triggered by a threshold number of connection status changes between the network interface-to-host machine pairs.

10. The method of claim 1, further comprising:
sending additional storage node messages to a plurality of storage nodes, from each of the network interfaces of the plurality of network interfaces on the particular storage node;
wherein the plurality of storage nodes are operatively coupled to the one or more storage devices that are accessible to the one or more host machines through any network interface attached to any one of the plurality of storage nodes;
receiving, by the particular storage node, response messages from at least one storage node of the plurality of storage nodes; and
updating, by the particular storage node, the connectivity map to include information about connectivity between each network interface of the plurality of network interfaces and each of the network interfaces attached to the plurality of storage nodes, based upon the additional storage node messages sent from each network interface of the plurality of network interfaces and the response messages received from the at least one storage node of the plurality of storage nodes.

11. A non-transitory computer-readable medium that stores instructions for determining network-interface-to-host-machine connectivity information between devices in a network system which, when executed by one or more processors, cause performance of:
sending storage node messages to each host machine of a plurality of host machines, from each network interface of a plurality of network interfaces on a particular storage node;
wherein the particular storage node is operatively coupled to one or more storage devices that are accessible to each host machine that has connectivity to any one of the plurality of network interfaces;
wherein the plurality of network interfaces includes at least two network interfaces of a particular storage controller of the particular storage node;
in response to the storage node messages, receiving, by the particular storage node, host messages from at least one host machine of the plurality of host machines;
determining, by the particular storage node, the network-interface-to-host-machine connectivity information between each network interface of the plurality of network interfaces and each host machine of the one or more host machines, based upon the storage node messages sent from each network interface of the plurality of network interfaces and the host messages received from the at least one host machine;
generating, by the particular storage node, a connectivity map containing the network-interface-to-host-machine connectivity information determined from the storage node messages sent from each network interface of the plurality of network interfaces and the host messages received from the at least one host machine;

wherein the network-interface-to-host-machine connectivity information indicates that connectivity between a particular network interface of the plurality of network interfaces and a particular host machine of the one or more host machines is down if a particular number of storage node messages is sent from the particular network interface to the particular host machine without receiving a host message from the particular host machine;

wherein the network-interface-to-host-machine connectivity information includes latency information between each network interface of the plurality of network interfaces and each host machine of the one or more host machines, wherein latency information is based on a duration of time between sending a particular storage node message and receiving a particular host message as a response to the particular storage node message;

receiving, at the particular storage node, a connectivity status request from a particular host machine of the plurality of host machines;

in response to the connectivity status request, the particular storage node providing network-interface-to-host-machine connectivity information between each network interface of the plurality of network interfaces and each host machine of the one or more host machines to the particular host machine;

based on the network-interface-to-host-machine connectivity information received from the particular storage node, the particular host machine selecting a target network interface, of the plurality of network interfaces, for sending a request for data to the particular storage node;

sending, by the particular host machine, the request for data to the selected target network interface; and receiving, at the selected target network interface of the plurality of network interfaces, the request for data that is stored on the one or more storage devices.

12. The non-transitory computer-readable medium of claim 11, wherein the one or more host machines comprise one or more host network interfaces, each capable of sending host messages and receiving storage node messages.

13. The non-transitory computer-readable medium of claim 11, further comprising instructions which, when executed by the one or more processors, cause performance of:

generating, by the particular storage node, a blacklist of down connection paths of network interface-to-host machine pairs, wherein the blacklist of down connection paths comprises a set of network interface-to-host machine pairs that have been determined to be down for a particular period of time based upon the connectivity map; and sending, by the particular storage node, the blacklist of down connection paths to the one or more host machines.

14. The non-transitory computer-readable medium of claim 11, further comprising instructions which, when executed by the one or more processors, cause performance of:

generating, by the particular storage node, a whitelist of up connection paths of network interface-to-host machine pairs, wherein the whitelist of up connection paths comprises a set of network interface-to-host machine pairs that have been determined to be up for a particular period of time based upon the connectivity map; and sending, by the particular storage node, the whitelist of up connection paths to the one or more host machines.

15. The non-transitory computer-readable medium of claim 11, wherein the storage node messages are a first type of test messages that are used to determine whether connectivity is capable sending a first type of data packets between each host machine of one or more host machines and each network interface of the plurality of network interfaces, and wherein the first type of test messages is scheduled to be sent to the one or more host machines a first threshold number of times, wherein the first type of test messages is a large sized message and the first type of data packets is a large data packet.

16. The non-transitory computer-readable medium of claim 11, further comprising instructions which, when executed by the one or more processors, cause performance of:

associating, by the particular storage node, a floating IP address with a physical address associated within the particular network interface;

receiving, at the particular network interface associated with the floating IP address, a request from a particular host machine, of the one or more host machines, for the network-interface-to-host-machine connectivity information related to the particular host machine from the connectivity map; and in response to the request from the particular host machine, sending the network-interface-to-host-machine connectivity information to the particular host machine to enable the particular host machine to select a particular target network interface, from among the plurality of network interfaces, to which to send requests for data that is stored on the one or more storage devices.

17. The non-transitory computer-readable medium of claim 11, further comprising instructions which, when executed by the one or more processors, cause performance of:

wherein the particular storage node is a first storage node of a plurality of storage nodes and the plurality of network interfaces is a first plurality of network interfaces;

sending additional storage node messages to each host machine of the one or more host machines, from each network interface of a second plurality of network interfaces on a second storage node;

wherein the second storage node is operatively coupled to the one or more storage devices that are accessible to the one or more host machines through any one of the second plurality of network interfaces;

receiving, by the second storage node, second host messages from at least one host machine of the one or more host machines; and updating, by the second storage node, the connectivity map to include information about connectivity between each network interface of the second plurality of network interfaces and each host machine of the one or more host machines, based upon the storage node messages sent from each network interface of the second plurality of network interfaces and the second host messages received from the at least one host machine.

18. The non-transitory computer-readable medium of claim 11, further comprising instructions which, when executed by the one or more processors, cause performance of generating, by the particular storage node, a connection status health report of the network-interface-to-host-machine connectivity information for connections of network interface-to-host machine pairs, wherein the connection status health report comprises a set of network interface-to-host machine pairs and the network-interface-to-host-machine connectivity information for each network interface-to-host machine pair in the set of network interface-to-host machine pairs that describes whether the connection is up or down and connection quality based upon the connectivity map.

19. The non-transitory computer-readable medium of claim 18, wherein generating the connection status health report is triggered by a threshold number of connection status changes between the network interface-to-host machine pairs.

20. The non-transitory computer-readable medium of claim 11, further comprising instructions which, when executed by the one or more processors, cause performance of:

sending additional storage node messages to a plurality of storage nodes, from each of the network interfaces of the plurality of network interfaces on the particular storage node;

wherein the plurality of storage nodes are operatively coupled to the one or more storage devices that are accessible to the one or more host machines through any network interface attached to any one of the plurality of storage nodes;

receiving, by the particular storage node, response messages from at least one storage node of the plurality of storage nodes; and updating, by the particular storage node, the connectivity map to include information about connectivity between each network interface of the plurality of network interfaces and each of the network interfaces attached to the plurality of storage nodes, based upon the additional storage node messages sent from each network interface of the plurality of network interfaces and the response messages received from the at least one storage node of the plurality of storage nodes.

* * * * *